US006970146B1

(12) United States Patent
    Jun

(10) Patent No.: US 6,970,146 B1
(45) Date of Patent: Nov. 29, 2005

(54) FLAT PANEL DISPLAY AND DIGITAL DATA PROCESSING DEVICE USED THEREIN

(75) Inventor: Sung-Gon Jun, Kyunggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 09/212,292

(22) Filed: Dec. 16, 1998

(30) Foreign Application Priority Data

Dec. 16, 1997 (KR) ..................... 97-37478

(51) Int. Cl.$^7$ ........................................... G09G 5/00
(52) U.S. Cl. ........................... 345/3.1; 345/13; 345/87; 345/214
(58) Field of Search .......................... 345/3, 132, 214, 345/204, 213, 1, 154, 1.1–1.3, 2.1–2.3, 3.1–3.4, 345/13, 55, 87; 348/569, 792, 564

(56) References Cited

U.S. PATENT DOCUMENTS

| | | | | |
|---|---|---|---|---|
| 4,549,175 A | * | 10/1985 | Rokunohe et al. ........... 340/794 |
| 5,150,109 A | * | 9/1992 | Berry ........................ 345/600 |
| 5,430,457 A | * | 7/1995 | Zenda ........................ 345/3.3 |
| 5,479,183 A | | 12/1995 | Fujimoto | |
| 5,491,496 A | | 2/1996 | Tomiyasu ....................... 345/3 |
| 5,534,883 A | | 7/1996 | Koh ............................. 345/3 |
| 5,579,025 A | | 11/1996 | Itoh ............................. 345/3 |
| 5,606,348 A | | 2/1997 | Chiu ............................ 345/3 |
| 5,608,418 A | | 3/1997 | McNally ......................... 345/3 |
| 5,629,715 A | | 5/1997 | Zenda ............................ 345/3 |
| 5,670,969 A | * | 9/1997 | Yamagami et al. ........... 345/3.1 |
| 5,673,058 A | | 9/1997 | Uragami et al. ................ 345/3 |
| 5,694,141 A | | 12/1997 | Chee ............................. 345/3 |
| 5,710,570 A | | 1/1998 | Wada et al. ................... 345/3 |
| 5,739,808 A | * | 4/1998 | Suga et al. ................. 345/132 |
| 5,764,201 A | | 6/1998 | Ranganathan ................. 345/3 |
| 5,786,813 A | * | 7/1998 | Kurikko ...................... 345/212 |
| 5,828,349 A | | 10/1998 | MacHesney et al. ........... 345/3 |
| 5,841,418 A | | 11/1998 | Bril et al. ..................... 345/3 |
| 5,870,073 A | * | 2/1999 | Kitou et al. ................. 345/132 |
| 5,870,086 A | * | 2/1999 | Bang ........................ 345/214 |
| 5,880,745 A | * | 3/1999 | Miichi ............................ 345/3 |
| 5,990,858 A | * | 11/1999 | Ozolins ....................... 345/99 |
| 6,043,814 A | * | 3/2000 | Lim ........................... 345/132 |
| 6,078,317 A | * | 6/2000 | Sawada ....................... 345/204 |
| 6,195,087 B1 | * | 2/2001 | Wu ............................ 345/213 |
| 6,198,468 B1 | * | 3/2001 | Cho ............................ 345/213 |
| 6,292,162 B1 | * | 9/2001 | Shiki .......................... 345/98 |
| 6,340,959 B1 | * | 1/2002 | Inamori ....................... 345/3.1 |

* cited by examiner

Primary Examiner—Henry N. Tran
(74) Attorney, Agent, or Firm—Robert E. Bushnell, Esq.

(57) ABSTRACT

A flat panel display for receiving digital display information including video data and synchronizing data from a host includes: a receiver for reconstructing the display information, a synchronizing signal generator for generating a synchronizing signal by extracting the synchronizing data from the reconstructed display information, a digital-to-analog converter for converting the video data to a corresponding video signal, and an output terminal for externally transferring the synchronizing signal and analog video signal to an analog display. A video data converter is further included to convert line and dot numbers of the video data so as to correspond to a prescribed display mode when the synchronizing data has a different characteristic from the prescribed display mode. The synchronizing signal generator generates the synchronizing signal corresponding to the display mode.

28 Claims, 2 Drawing Sheets

FLAT PANEL DISPLAY AND DIGITAL DATA PROCESSING DEVICE USED THEREIN

CLAIM OF PRIORITY

This application makes reference to, incorporates the same herein, and claims all benefits accruing under 35 U.S.C. §119 from an application for FLAT PANEL DISPLAY AND DIGITAL DATA PROCESSING DEVICE USED THEREIN earlier filed in the Korean Industrial Property Office on the 16$^{th}$ of Dec. 1997 and there duly assigned Serial No. 37478/1997.

BACKGROUND OF THE INVENTION

1. Field of the Invention

The present invention concerns a flat panel display for receiving display information by means of a digital communication, and a digital processing device for utilizing it to connect to an analog display.

2. Description of the Related Art

It has been usual for a digital processing device such as a personal computer system to use a CRT (Cathode Ray Tube) for a display. Nowadays, a flat panel display such as an LCD (Liquid Crystal Display) or plasma display is also widely used. Such a flat panel display reproduces the image by converting the video signal received from a host such as a personal computer system to corresponding digital data.

An LCD system generally includes an ADC (Analog-to-Digital Converter), a PLL circuit (Phase Locked Loop), a video data converter, an LCD driver, and an LCD panel. The ADC converts an analog R(red), G(green) and B(blue) video signal to corresponding digital video data. The PLL circuit generates an internal clock signal in response to a synchronizing signal received from a host. The video data converter converts the digital video data according to a clock signal. This is to accommodate the dot and line numbers of the video data supplied to the LCD driver when the resolution provided by the host differs from that of the display. The LCD panel is driven by the LCD driver, displaying the video signal. Such a flat panel display system suffers from the following drawbacks:

The ADC for converting the analog video signal of the host to the digital video signal must perform the sampling operation at the rate of at least twice the frequency of the analog video signal. Additionally, the PLL circuit must have a wide locking range. This causes considerable increase of the overall production cost of the flat panel display. Moreover, a signal loss may frequently occur as well as jittering during analog-to-digital conversion, making the conversion unstable. Further, the allowable frequency range of the input signal is very limited owing to the operational characteristics of the ADC and PLL circuit. In addition, the screen size of the flat panel display is generally so small that it is inconvenient to make a presentation to many people.

The following each disclose features in common with the present invention: U.S. Pat. No. 5,608,418 to McNally, entitled Flat Panel Display Interface For A High Resolution Computer Graphics System, U.S. Pat. No. 5,491,496 to Tomiyasu, entitled Display Control Device For Use With Flat-Panel Display And Color CRT Display, U.S. Pat. No. 5,606,348 to Chiu, entitled Programmable Display Interface Device And Method, U.S. Pat. No. 5,479,183 to Fujimoto, entitled Apparatus And Method For Detecting An Optical CRT Display Connected To A Computer System, U.S. Pat. No. 5,828,349 to MacHesney et al., entitled Method And System For Multiplexing And Demultiplexing Video Signals For Graphic Display Monitors In Computer Systems, U.S. Pat. No. 5,841,418 to Bril et al., entitled Dual Displays Having Independent Resolutions And Refresh Rates, U.S. Pat. No. 5,764,201 to Ranganathan, entitled Multiplexed Yuv-Movie Pixel Path For Driving Dual Displays, U.S. Pat. No. 5,710,570 to Wada et al., entitled Information Processing Unit Having Display Functions, U.S. Pat. No. 5,673,058 to Uragami et al., entitled One-Chip Semiconductor Integrated Circuit Device Capable Of Outputting Analog Color Signal Or Digital Color Signal, U.S. Pat. No. 5,629,715 to Zenda, entitled Display Control System, U.S. Pat. No. 5,694,141 to Chee, entitled Computer System With Double Simultaneous Displays Showing Differing Display Images, U.S. Pat. No. 5,579,025 to Itoh, entitled Display Control Device For Controlling First And Second Displays Of Different Types, and U.S. Pat. No. 5,534,883 to Koh, entitled Video Signal Interface.

SUMMARY OF THE INVENTION

It is an object of the present invention to provide a flat panel display which displays digital display information supplied by a digital data processing device.

It is another object of the present invention to provide a flat panel display with means for connecting to an analog display, which may make a convenient presentation to many people.

According to an embodiment of the present invention, a flat panel display for receiving display information including video data and synchronizing data from a host processing digital data in a serial digital communication, may be constructed with a receiver for reconstructing the display information, a synchronizing signal generator for generating a synchronizing signal by extracting the synchronizing data from the reconstructed display information, a digital-to-analog converter (DAC) for converting the video data to a corresponding video signal, and an output terminal for externally transferring the synchronizing signal and analog video signal to an analog display.

Preferably, a video data converter is further included to convert the line and dot numbers of the video data so as to correspond to a prescribed display mode when the synchronizing data has a different characteristic from the prescribed display mode. The synchronizing signal generator is accommodated to generate the synchronizing signal corresponding to the display mode.

According to another embodiment of the present invention, there is provided a digital data processing device, which may be used in a flat panel display for displaying display information received from a host processing digital data, and a transmitter connected to the host to transfer digital display information as serial data, a receiver for reconstructing the display information, a synchronizing signal generator for generating a synchronizing signal by extracting the synchronizing data from the reconstructed display information, a DAC for converting the video data to a corresponding video signal, and an output terminal for externally transferring the synchronizing signal and analog video signal to an analog display. The flat panel display includes the receiver, synchronizing signal generator and output terminal.

Preferably, a video data converter is further included to convert the line and dot numbers of the video data so as to correspond to a prescribed display mode when the synchronizing data has a different characteristic from the prescribed display mode. The synchronizing signal generator is accommodated to generate the synchronizing signal corresponding to the display mode.

Thus, the host provides the display information as serial digital data, which is transferred to the flat panel display to display the digital video signal, and/or converted to an analog video signal, which is supplied to an analog display to display the analog video signal according to the synchronizing signal.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
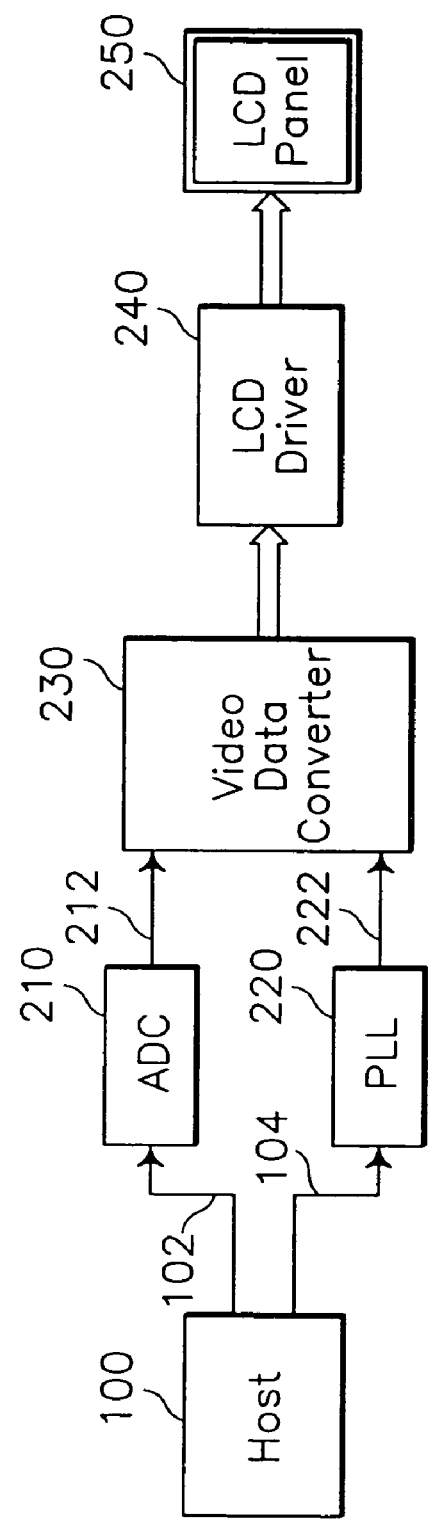
FIG. 1 is a block diagram for schematically showing the circuit of an earlier LCD system.

FIG. 1 is a block diagram of the LCD system discussed in the Description of the Related Art above.

The illustrated LCD system includes an ADC 210, a PLL circuit 220, a video data converter 230, an LCD driver 240, and an LCD panel 250. The ADC 210 converts an analog video signal 102 to corresponding digital video data 212. The PLL circuit 220 generates an internal clock signal in response to a synchronizing signal 104 received from a host 100. The video data converter 230 converts the digital video data 212 according to a clock signal 222. This is to accommodate the dot and line numbers of the video data supplied to the LCD driver 240 when the resolution provided by the host 100 differs from that of the display. The LCD panel 250 is driven by the LCD driver 240 displaying the video signal.

Figure 2:
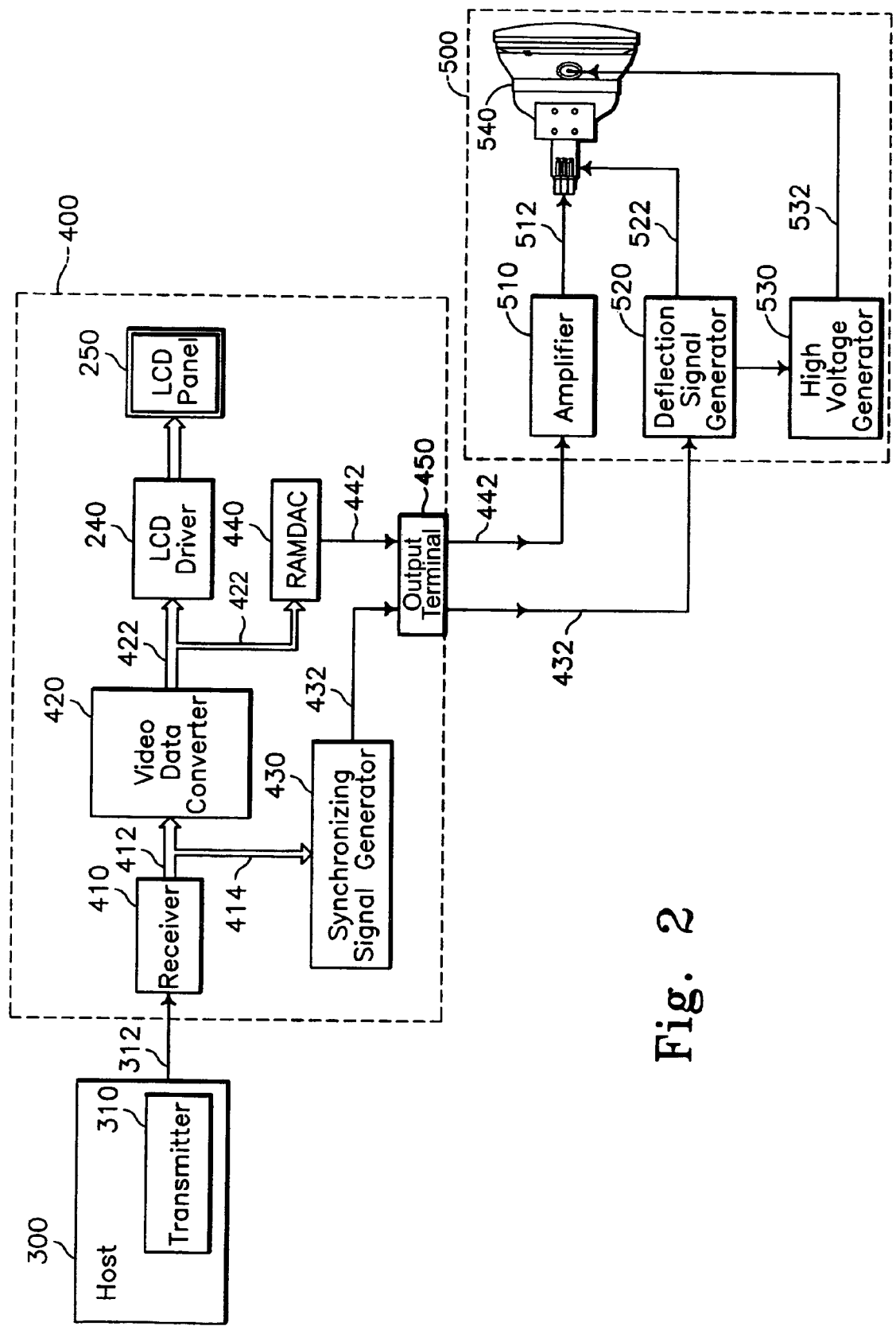
FIG. 2 is a block diagram for schematically showing the circuit of an LCD system provided with means for connecting to a CRT according to the present invention.

Referring to FIG. 2, a host 300 is provided with a transmitter 310 to transfer display information 312 by means of a digital communication, for example, according to the IEEE 1394 format. The inventive LCD system 400 includes a receiver 410, a video data converter 420, a synchronizing signal generator 430, an LCD driver 240, a RAMDAC 440, an output terminal 450, and an LCD panel 250.

The receiver 410 reconstructs the display information 312 received from the transmitter 310 to provide the video data converter 420 with data 412 including R, G, B video data and a dot clock signal. The video data converter 420, if a conversion of the video data is required, changes the dot and line numbers of the video data to correspond to the resolution supported by the LCD system 400, delivering the converted video data 422 to the LCD driver 240. On the other hand, the converted video data 422 is supplied to the RAMDAC 440 for conversion to the analog R, G, B video signal 442 delivered to the output terminal 450. Synchronizing data 414 for horizontal and vertical synchronization is supplied to the synchronizing signal generator 430 to generate a synchronizing signal 432 delivered to the output terminal 450 for the analog display.

The analog display connected to the output terminal 450 may be, for example, a CRT display 500, which comprises an amplifier 510, a deflection signal generator 520, a high voltage generator 530, and a CRT 540. The CRT display 500 receives the analog video signal 442 and synchronizing signal 432 through the output terminal 450. The analog video signal 442 is amplified through the amplifier 510, which supplies the amplified video signal 512 to the CRT 540. The synchronizing signal 432 is transferred to the deflection signal generator 520 to supply the corresponding deflection signal 522 to the CRT 540.

Thus, the host 300 supplies serially the digital display data to the LCD system 400 to display the image on the LCD panel 250 while the CRT display 500 connected to the output terminal 450 of the LCD 400 receives the analog video signal and synchronizing signal to display the image through the CRT 540.

As described above, the inventive flat panel display does not require a separate ADC because it receives the display information in digital data, and provides means for connecting an analog display.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A flat panel display apparatus for receiving display information including video data and synchronizing data from a host, said flat panel display apparatus comprising:
   a receiver for receiving and reconstructing said display information;
   a synchronizing signal generator having an input connected to an output of said receiver for generating a synchronizing signal by extracting the synchronizing data from said reconstructed display information;
   a digital-to-analog converter (DAC) for converting said video data from said reconstructed display information to a corresponding analog video signal; and
   an output terminal connected to said synchronizing signal generator and to said DAC for transferring said synchronizing signal and said corresponding analog video signal to an analog display apparatus.

2. The display apparatus of claim 1, further comprising:
   a video data converter connected between an output of said receiver and an input of said DAC for converting said video data;
   a liquid crystal display (LCD) driver for receiving the converted video data from said video data converter and producing a driver output; and
   an LCD display panel for receiving the driver output from said LCD driver.

3. The display apparatus of claim 1, said analog display apparatus comprising:
   an amplifier for receiving said analog video signal from said DAC via said output terminal, and for amplifying said analog video signal;
   a deflection signal generator for receiving said synchronizing signal from said synchronizing signal generator via said output terminal, and for generating deflection signals;
   a high voltage generator having an input connected to said deflection signal generator for receiving an output from said deflection signal generator, and for generating a high voltage; and
   a cathode ray tube (CRT) display for receiving said amplified analog video signal from said amplifier, said deflection signals from said deflection signal generator, and said high voltage from said high voltage generator.

4. The display apparatus of claim 1, further comprising a video data converter connected between the output of said receiver and an input of said DAC for converting said video data so as to correspond to a prescribed display mode.

5. The display apparatus of claim 4, wherein said video data converter converts video data so as to correspond to the prescribed display mode when said synchronizing signal has a characteristic different from the prescribed display mode.

6. The display apparatus of claim 4, wherein said synchronizing signal generator generates said synchronizing signal in correspondence to the prescribed display mode.

7. The display apparatus of claim 4, wherein said video data converter converts line and dot numbers of said video data so as to correspond to the prescribed display mode.

8. The display apparatus of claim 1, wherein said flat panel display apparatus operates without need for an analog-to-digital converter (ADC) or a phase-locked loop (PLL) circuit for signal conversion.

9. A digital data processing system comprising the combination of a host and a flat panel display apparatus as recited in claim 1, said system further comprising a transmitter connected to said host for transferring said display information as serial data from said host to said receiver of said flat panel display apparatus.

10. The system of claim 9, further comprising a video data converter connected between the output of said receiver and an input of said DAC for converting said video data so as to correspond to a prescribed display mode.

11. The system of claim 10, further comprising:
a liquid crystal display (LCD) driver for receiving the converted video data from said video data converter and producing a driver output; and
an LCD display panel for receiving the driver output from said LCD driver.

12. The system of claim 10, wherein said video data converter converts said video data so as to correspond to the prescribed display mode when said synchronizing signal has a characteristic different from the prescribed display mode.

13. The system of claim 10, wherein said synchronizing signal generator generates said synchronizing signal in correspondence to the prescribed display mode.

14. The system of claim 10, wherein said video data converter converts line and dot numbers of said video data so as to correspond to the prescribed display mode.

15. The system of claim 9, wherein said flat panel display apparatus operates without need for an analog-to-digital converter (ADC) or a phase-locked loop (PLL) circuit for signal conversion.

16. A flat panel display apparatus for receiving display information including video data and synchronizing data from a host, said flat panel display apparatus comprising:
a receiver for receiving and reconstructing said display information;
a synchronizing signal generator having an input connected to an output of said receiver for generating a synchronizing signal by extracting the synchronizing data from said reconstructed display information;
a video data converter connected to the output of said receiver for converting said video data so as to correspond to a prescribed display mode;
a digital-to-analog converter (DAC) connected to an output of said video data converter for converting said converted video data from said video data converter to a corresponding analog video signal; and
an output terminal connected to an output of said synchronizing signal generator and to an output of said DAC for transferring said synchronizing signal and said corresponding analog video signal to an analog display apparatus.

17. The display apparatus of claim 16, said analog display apparatus comprising:
an amplifier for receiving said analog video signal from said DAC via said output terminal, and for amplifying said analog video signal;
a deflection signal generator for receiving said synchronizing signal from said synchronizing signal generator via said output terminal, and for generating deflection signals;
a high voltage generator having an input connected to said deflection signal generator for receiving an output from said deflection signal generator, and for generating a high voltage; and
a cathode ray tube (CRT) display for receiving said amplified analog video signal from said amplifier, said deflection signals from said deflection signal generator, and said high voltage from said high voltage generator.

18. The display apparatus of claim 16, further comprising:
a liquid crystal display (LCD) driver for receiving the converted video data from said video data converter and producing a driver output; and
an LCD display panel for receiving the driver output from said LCD driver.

19. The display apparatus of claim 16, wherein said video data converter converts said video data so as to correspond to the prescribed display mode when said synchronizing signal has a characteristic different from the prescribed display mode.

20. The display apparatus of claim 16, wherein said synchronizing signal generator generates said synchronizing signal in correspondence to the prescribed display mode.

21. A digital data processing system comprising the combination of a host and a flat panel display apparatus as recited in claim 16, said system further comprising a transmitter connected to said host for transferring said display information as serial data from said host to said receiver of said flat panel display apparatus.

22. The system of claim 21, further comprising:
a liquid crystal display (LCD) driver for receiving the converted video data from said video data converter and producing a driver output; and
an LCD display panel for receiving the driver output from said LCD driver.

23. The system of claim 21, wherein said video data converter converts said video data so as to correspond to the prescribed display mode when said synchronizing signal has a characteristic different from the prescribed display mode.

24. The system of claim 21, wherein said synchronizing signal generator generates said synchronizing signal in correspondence to the prescribed display mode.

25. The system of claim 21, wherein said video data converter converts line and dot numbers of said video data so as to correspond to the prescribed display mode.

26. The system of claim 21, wherein said flat panel display apparatus operates without need for an analog-to-digital converter (ADC) or a phase-locked loop (PLL) circuit for signal conversion.

27. The display apparatus of claim 16, wherein said video data converter converts line and dot numbers of said video data so as to correspond to the prescribed display mode.

28. The display apparatus of claim 16, wherein said flat panel display apparatus operates without need for an analog-to-digital converter (ADC) or a phase-locked loop (PLL) circuit for signal conversion.

* * * * *